United States Patent
Jou et al.

(10) Patent No.: US 6,546,248 B1
(45) Date of Patent: Apr. 8, 2003

(54) METHOD AND APPARATUS FOR GENERATING PILOT STRENGTH MEASUREMENT MESSAGES

(75) Inventors: Yu-Cheun Jou, San Diego, CA (US); Jun Wang, San Diego, CA (US); Ramin Rezaiifar, San Diego, CA (US); Baaziz Achour, San Diego, CA (US); Tao Chen, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/502,279

(22) Filed: Feb. 10, 2000

(51) Int. Cl.[7] .............................. H04Q 7/20; H04B 7/00
(52) U.S. Cl. ....................... 455/434; 455/434; 455/436; 455/515; 370/335
(58) Field of Search ................... 455/436, 437, 455/438, 439, 73, 67.2, 69, 70, 226.1, 226.2, 522, 226.3, 67.1, 524, 442, 440, 434, 515; 375/224, 227; 370/252, 335, 332, 342

(56) References Cited

U.S. PATENT DOCUMENTS

| 4,901,307 A | 2/1990 | Gilhousen et al. |
| 5,056,109 A | 10/1991 | Gilhousen et al. |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,267,261 A * | 11/1993 | Blakeney, II et al. ....... 370/332 |
| 5,577,022 A * | 11/1996 | Padovani et al. ........... 370/332 |
| 5,805,648 A | 9/1998 | Sutton |
| 6,018,662 A | 1/2000 | Periyalwar et al. ......... 455/442 |
| 6,075,989 A * | 6/2000 | Moore et al. ............... 455/436 |
| 6,263,208 B1 * | 7/2001 | Chang et al. ............... 455/456 |
| 6,266,529 B1 * | 7/2001 | Chheda ...................... 455/436 |

FOREIGN PATENT DOCUMENTS

EP    0948231    3/1999

OTHER PUBLICATIONS

Gang, et al. "The Design of Pilot Strength Analysis Function to Soft Handoff in CDMA Systems" Proceedings of the IEEE Region 10, 2:1186–1190 (1999).

* cited by examiner

Primary Examiner—Charles Appiah
(74) Attorney, Agent, or Firm—Philip Wadsworth; Kent D. Baker; Kyong H. Macek

(57) ABSTRACT

A method and apparatus for generating an autonomous Pilot Strength Measurement Message (PSMM) by a mobile station traveling in a multi-carrier wireless communication system. In a multi-carrier system, the mobile station receives the pilot channel of a base station on multiple carrier frequencies simultaneously. Fading may vary from carrier frequency to carrier frequency. New pilot strength definitions are used by the mobile station in a set of rules transmitted by the base station. The set of rules determines autonomous generation and transmission of PSMMs by the mobile station upon detection of pilots.

6 Claims, 3 Drawing Sheets

METHOD AND APPARATUS FOR GENERATING PILOT STRENGTH MEASUREMENT MESSAGES

BACKGROUND OF THE INVENTION

I. Field of the Invention

The present invention pertains generally to the field of communications, and more particularly to generating pilot strength measurement messages in a wireless communication system.

II. Background

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems." Other non-CDMA based digital standards include the time-division multiple access (TDMA) based Global System for Mobile Communications (GSM), and the U.S. TDMA standard TIA/EIA IS-54 series.

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or PCS telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in copending U.S. patent application Ser. No. 08/509,721, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels are described in more detail in the above referenced U.S. Pat. No. 5,103,459 and will not be discussed in detail herein.

The acquisition procedure for searching and acquiring the pilot channel signals from base stations has the purpose of detecting potential candidate base stations for handoff. The viable base station candidates can be divided into four sets. These sets are used to prioritize the pilots and increase the efficiency of searching. The first set, referred to as the Active Set, comprises base stations that are currently in communication with the mobile station. The second set, referred to as the Candidate Set, comprises base stations that have been determined to be of sufficient strength to be of use to the mobile station. Base stations are added to the candidate set when their measured pilot energy exceeds a predetermined threshold $T_{ADD}$. The third set is the Neighbor Set which is the set of base stations which are in the vicinity of the mobile station (and which are not included in the Active Set or the Candidate Set). And the fourth set is the Remaining Set that consists of all other base stations.

In an IS-95A communication system, the mobile station sends an autonomous Pilot Strength Measurement Message (PSMM) when the mobile station finds a pilot of sufficient strength that is not associated with any of the Forward Traffic Channels currently being demodulated or when the strength of a pilot that is associated with one of the Forward Traffic Channels being demodulated drops below a threshold for a predetermined period of time. The term pilot refers to a pilot channel identified by a pilot sequence offset and a frequency assignment. The mobile station sends an autonomous PSMM following the detection of a change in the pilot strength when one of the following conditions are met:

1. The strength of a Neighbor Set or Remaining Set pilot is found above the threshold ($T_{ADD}$).
2. The strength of a Candidate Set pilot exceeds the strength of an Active Set pilot by more than a threshold ($T_{COMP}$)×0.5 dB, and a PSMM carrying this information has not been sent since the last Handoff Direction Message (HDM) or Extended Handoff Direction Message (EHDM) was received.

3. The strength of a pilot in the Active Set of Candidate Set has fallen below a threshold ($T_{DROP}$) for greater than a predetermined time period ($T_{TDROP}$), and a PSMM carrying this information has not been sent since the last HDM or EHDM was received.

$T_{ADD}$ is threshold above which the received signal is of sufficient strength to effectively provide communications with the mobile station. $T_{DROP}$ is a threshold value below which the received signal energy is insufficient to effectively provide communications with the mobile station.

In an IS-95B communication system, the mobile station sends an autonomous PSMM according to one of two sets of rules as chosen by the base station. The first set of rules is the same as the rules specified in IS-95A. The second set of rules uses a dynamic threshold defined as:

$$T_{DYN} = \frac{SOFT\_SLOPE}{8} \times 10 \times \log \sum_{i \in A} (Pilot\ Ec/Io)_i + \frac{ADD\_INTERCEPT}{2},$$

where the parameters SOFT_SLOPE and ADD_INTERCEPT are specified by the base station and the summation is performed over all pilots in the Active Set. Ec/Io is the ratio of pilot energy per chip to the total received spectral density of noise and signals.

According to the second set of rules of IS-95B, the mobile station sends an autonomous PSMM if any of the following conditions occur:

1. The pilot strength of a Candidate Set pilot is found to be above $T_{DYN}$, and a PSMM carrying this information has not been sent since the last EHDM or General Handoff Direction Message (GHDM) was received;
2. The pilot strength of a Neighbor Set pilot or Remaining Set pilot is found to be above max($T_{DYN}$, $T_{ADD/2}$);
3. The pilot strength of a Candidate Set pilot exceeds the strength of any Active Set pilot by $T_{COMP} \times 0.5$ dB and is above $T_{DYN}$, and a PSMM carrying this information has not been sent since the last EHDM or GHDM was received;
4. The handoff drop timer of an Active Set pilot has expired and a PSMM carrying this information has not been sent since the last EHDM or GHDM was received.

The rules according to IS-95A and IS-95B are designed for single carrier systems that use a 1.25 MHz channel on both the forward link and the reverse link. However, in a multi-carrier system, the mobile station receives the pilot channel of a base station on multiple carrier frequencies simultaneously. For example, a 3×/1× multi-carrier system may use three 1.25 MHz channels on the forward link and one 1.25 MHz channel on the reverse link. Another example is a 3×/3× multi-carrier system using three 1.25 MHz channels on the forward link and a 3.75 MHz channel on the reverse link. In either example, one can see short term fading that varies from one carrier frequency to another. In such a situation, the IS-95 rules that govern the autonomous transmission of a PSMM are inadequate in the presence of pilots on multiple pilot channels. Hence, there is a present need to determine when a mobile station transmits an autonomous PSMM according to the receipt of multiple pilot signals from base stations in multi-carrier systems.

SUMMARY

The present invention is directed to a method and apparatus for generating an autonomous Pilot Strength Measurement Message (PSMM) by a mobile station in a multi-carrier wireless communication system, comprising the steps of receiving a plurality of pilots at a mobile station, wherein the plurality of pilots are transmitted from at least one base station; using a first pilot strength definition from a set of pilot strength definitions to determine a pilot strength associated with at least one of the plurality of pilots; checking a set of rules, wherein the set of rules is for generating the PSMM by manipulating the first pilot strength definition; and generating the PSMM for transmission from the mobile station.

In one aspect of the invention, differing pilot strength definitions are used in the set of rules by applying one pilot strength definition in one rule while applying a different pilot strength definition in another rule. In another aspect of the invention, the PSMM generated by the mobile station carries pilot strength information that was not used to generate the PSMM.

DETAILED DESCRIPTION OF THE PREFERRED EMBODIMENTS

Figure 1:
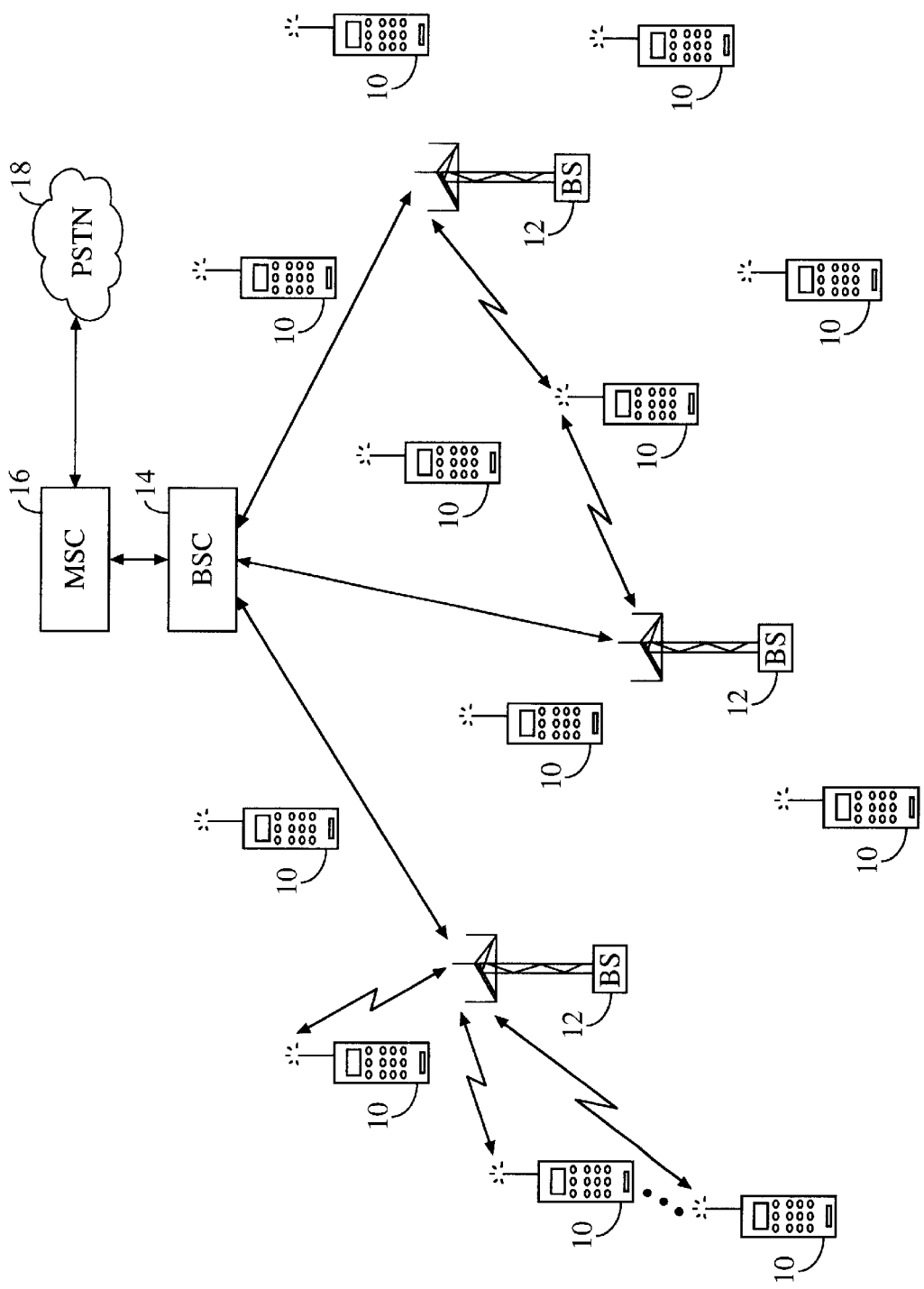
FIG. 1 is a diagram of an exemplary wireless communication system.

An exemplary wireless communication system in which the present invention is embodied is illustrated in FIG. 1. In a preferred embodiment, the communication system is a CDMA wireless communication system, although it should be understood that the present invention is equally applicable to other types of communication systems. Systems utilizing other well-known transmission modulation schemes such as TDMA and FDMA as well as other spread spectrum systems may employ the present invention.

As illustrated in FIG. 1, a CDMA wireless telephone system generally includes a plurality of mobile subscriber units (stations) 10, a plurality of base stations 12, base station controllers (BSCs) 14, and a mobile switching center (MSC) 16. The MSC 16 is configured to interface with a conventional public switch telephone network (PSTN) 18. The MSC 16 is also configured to interface with the BSCs 14. The BSCs 14 are coupled to the base stations 12 via backhaul lines. The backhaul lines may be configured to support any of several known interfaces including, e.g., E1/T1, ATM, IP, PPP, Frame Relay, HDSL, ADSL, or xDSL. It is understood that there may be more than two BSCs 14 in the system. Each base station 12 advantageously includes at least one sector (not shown), each sector comprising an omnidirectional antenna or an antenna pointed in a particular direction radially away from the base station 12. Alternatively, each sector may comprise two antennas for diversity reception. Each base station 12 may advantageously be designed to support a plurality of frequency assignments. The intersection of a sector and a frequency assignment may be referred to as a CDMA channel. The base stations 12 may also be known as base station transceiver subsystems (BTSs) 12. Alternatively, "base station" may be used in the industry to refer collectively to a BSC 14 and one or more BTSs 12. The BTSs 12 may also be denoted "cell sites" 12. Alternatively, individual sectors of a given BTS 12 may be referred to as cell sites. The mobile subscriber units 10 are typically cellular or PCS telephones 10.

During typical operation of the cellular telephone system, the base stations 12 receive sets of reverse link signals from sets of mobile stations 10. The mobile stations 10 are conducting telephone calls or other communications. Each reverse link signal received by a given base station 12 is processed within that base station 12. The resulting data is forwarded to the BSCs 14. The BSCs 14 provides call resource allocation and mobility management functionality including the orchestration of soft handoffs between base stations 12. The BSCs 14 also routes the received data to the MSC 16, which provides additional routing services for interface with the PSTN 18. Similarly, the PSTN 18 interfaces with the MSC 16, and the MSC 16 interfaces with the BSCs 14, which in turn control the base stations 12 to transmit sets of forward link signals to sets of mobile stations 10.

If a mobile station is travelling from the coverage area of a first base station in a single carrier system to a second base station in a single carrier system, then the rules of IS-95 are applicable. If the mobile station is travelling from the coverage of a multi-carrier system to another multi-carrier system, then various embodiments of the invention can be used to autonomously transmit a PSMM from the mobile station.

Figure 2:
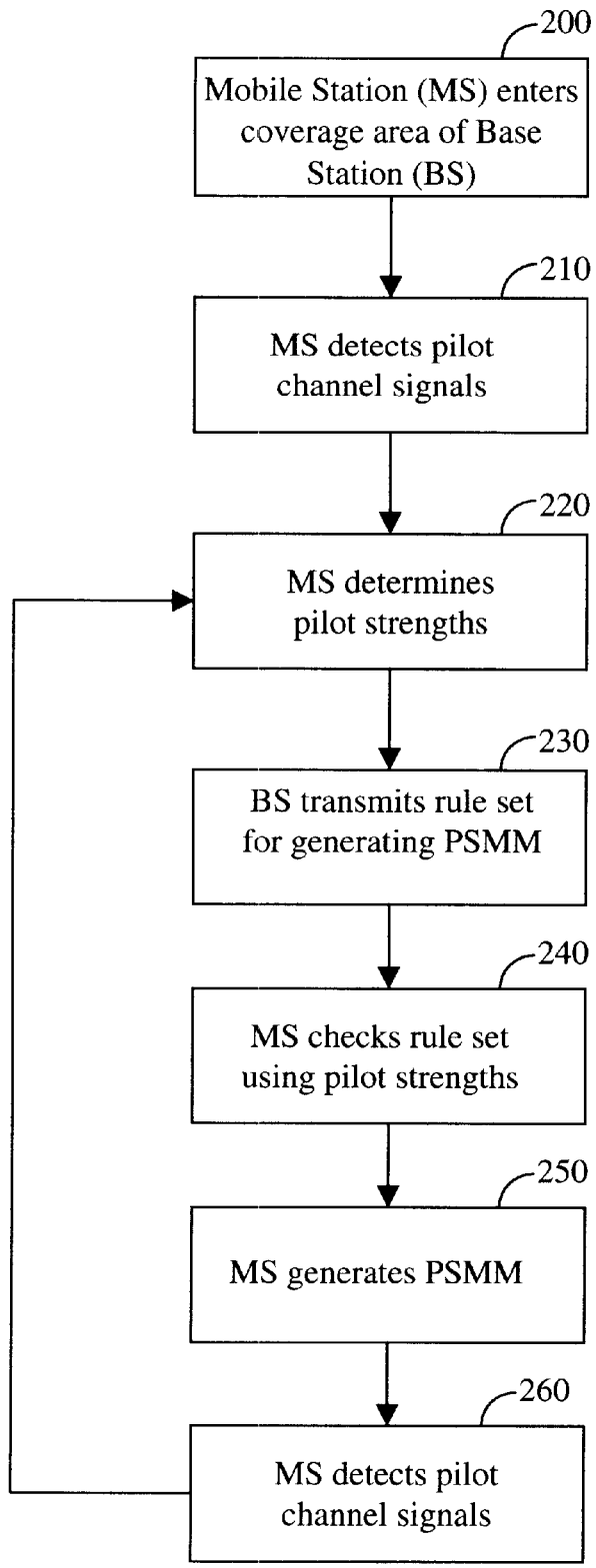
FIG. 2 is a flow chart illustrating an embodiment of the invention.

FIG. 2 is a block diagram of an embodiment of the invention wherein a mobile station within a multi-carrier system autonomously generates a PSMM. At step 200, the mobile station enters the coverage area of a number of neighboring base stations. For the purposes of clarity, the actions of only one base station is discussed herein, but it is understood that all neighboring base stations are acting in a similar manner to the arbitrary base station chosen for this discussion. At step 210, the mobile station is continuously searching and acquiring pilot channel signals from multiple carriers. At step 220, the mobile station determines the pilot strengths of the pilot channel signals according to the pilot strength definitions described herein. At step 230, a base station transmits a rule set for the mobile station, wherein the rule set contain conditions that guide the mobile station on the generation of autonomous PSMMs. It should be noted that step 230 is repeatedly performed by the base station throughout the process described herein, hence step 230 can be performed at any time in this embodiment of the invention. At step 240, the mobile station compares pilot strengths of the pilot channel signals to the conditions set forth in the rule set transmitted at step 230. At step 250, the mobile station generates a PSMM if the comparison at step 240 satisfies at least one of the conditions for generating a PSMM. At step 260, the mobile station resumes detection of pilot channel signals from multiple carriers and repeats the method herein.

In one embodiment of the invention, pilot strength can be defined in relation to the ratio of pilot energy per chip (Ec) to the total received spectral density of noise and signals (Io) so that the mobile station can still use the rules of IS-95. The pilot strengths for a 3× multi-carrier system are defined as follows:

$$PS1 = 10 \times \log(\text{primary pilot } Ec/Io), \quad (1)$$

where the primary pilot (typically the one with the strongest transmit power) is specified by the base station.

$$PS2 = 10 \times \log\{[(\text{Pilot } Ec/Io)_1/\Delta_1 + (\text{Pilot } Ec/Io)_2/\Delta_2 + (\text{Pilot } Ec/Io)_3/\Delta_3]/3\}, \quad (2)$$

where (Pilot Ec/Io)$_i$ is the pilot Ec/Io measured on the ith carrier frequency, and $\Delta_i$ is the ratio between the transmit power of pilot i and the transmit power of the primary pilot, i=1, 2 and 3.

$$PS3 = 10 \times \log\{\max[(\text{Pilot } Ec/Io)_1, (\text{Pilot } Ec/Io)_2, (\text{Pilot } Ec/Io)_3]\}. \quad (3)$$

$$PS4 = 10 \times \log\{\max[(\text{Pilot } Ec/Io)_1/\Delta_1, (\text{Pilot } Ec/Io)_2/\Delta_2, (\text{Pilot } Ec/Io)_3/\Delta_3]\}. \quad (4)$$

Although the pilot strengths of pilots in a 3× multi-carrier system are specified in the above pilot strength definitions, this embodiment of the invention can be used in larger or smaller multi-carrier systems by manipulating the Ec/Io terms of pilot channel signals from other carrier frequencies.

In Equation (1), pilot strength is determined solely by the Ec/Io of the primary pilot. In Equation (2), pilot strength is determined by the weighted sum of all three pilots. In Equation (3), the maximum of all three pilots is used. In Equation (4), the maximum power-adjusted pilot is used. A preferred approach is to use the IS-95 rules with the pilot strength defined by Equation (2). Another preferred approach is to use the IS-95 rules with the pilot strength defined by Equation (1), so that the mobile station need only search for the pilot on the primary channel. Another preferred approach is to implement a combination of the pilot strength definitions according to specified rules in the rule set. For example, the pilot strength definition of Equation (3) can be used if the system implements Rule 1 or Rule 2 of IS-95A, and the pilot strength definition of Equation (2) can be used if the system implements Rule 3 instead. Using this combination of pilot strength definitions, the mobile station will report rising Neighboring Set pilots more aggressively and report falling Active Set pilots more conservatively.

In another embodiment of the invention, pilot strengths can be defined according to the following equations:

$$PS5_1 = 10 \times \log[(\text{Pilot } Ec/Io)_1], \quad (5\text{-}1)$$

$$PS5_2 = 10 \times \log[(\text{Pilot } Ec/Io)_2], \quad (5\text{-}2)$$

$$PS5_3 = 10 \times \log[(\text{Pilot } Ec/Io)_3], \quad (5\text{-}3)$$

where the Ec/Io of each pilot is individually used.

In one embodiment of the invention, the definitions of pilot strength according to Equations (5-1), (5-2), and (5-3) can be used in conjunction with the IS-95 rules, wherein the pilots on each carrier are subject to comparisons as specified in the IS-95 rules. In another embodiment of the invention, the individual pilot strengths $PS5_1$, $PS5_2$, and $PS5_3$ are used within a new set of rules as described below:

1. The pilot strengths of a Neighbor Set or Remaining Set pilot satisfy the following:

$$PS5_1 > T_{ADD},$$

$$PS5_2 > T_{ADD} - [10 \times \log(\Delta_2)],$$

and $$PS5_3 > T_{ADD} - [10 \times \log(\Delta_3)].$$

2. All of the pilot strengths ($PS5_1$, $PS5_2$ and $PS5_3$) of a Candidate Set pilot exceed the corresponding strength of any Active Set pilot by $T_{COMP} \times 0.5$ dB, and a PSMM carrying this information has not been sent since the last Handoff Direction Message (HDM) or Extended Handoff Direction Message (EHDM) was received.

3. The handoff drop timer of an Active Set pilot has expired, i.e., $$PS5_1 < T_{DROP},$$

$$PS5_2 < T_{DROP} - [10 \times \log(\Delta_2)],$$

and $$PS5_3 < T_{DROP} - [10 \times \log(\Delta_3)],$$

for at least the time interval specified by $T_{TDROP}$, and a PSMM carrying this information has not been sent since the last HDM or EHDM was received.

When the pilot strengths defined by $PS5_1$, $PS5_2$, and $PS5_3$ are used in the above set of rules and at least one condition from the above set is met, the mobile station autonomously transmits a PSMM to the serving base station.

It should be noted that modifications to the above rules using pilot strengths from Equations (5-1), (5-2) and (5-3) can be made without limiting the scope of the invention. For example, Rule 2 of the above rule set can be replaced with the following rule:

Alternate 2. Any of the pilot strengths ($PS5_1$, $PS5_2$, and $PS5_3$) of a Candidate Set pilot exceeds the corresponding strength of any Active Set pilot by $T_{COMP} \times 0.5$ dB, and a PSMM carrying this information has not been sent since the last HDM or EHDM was received.

Different embodiments of the invention are also possible through the combination of pilot strengths $PS5_1$, $PS5_2$, and $PS5_3$ with other pilot strength definitions such as PS1, PS2, PS3 and PS4. A combination of these pilot strengths can be implemented in which one condition of the rule set uses one pilot strength definition while another pilot strength definition is used in conjunction with another condition.

The embodiments of the invention that were discussed up to this point are designed for implementation in a mobile station that is travelling from a multi-carrier system to another multi-carrier system. However, these embodiments can be modified to allow a mobile station to travel from a multi-carrier system to a single carrier system or vice versa.

In an embodiment where a mobile station is travelling from a multi-carrier system to a single carrier system, a single carrier system uses one of the channels in the multi-carrier system. Otherwise, the situation becomes a hard handoff. A hard handoff is one wherein the mobile station is transitioned between disjoint sets of base stations, different band classes, different frequency assignments or different time frames. The hard handoff search procedure will not be discussed in detail herein. In the case where two base stations are not simultaneously in the Active Set at the same time, the Active Set with multi-carrier pilots is replaced by a new Active Set with single carrier pilots. It should be noted that one can theoretically perform a soft handoff between a 3x/1x base station (i.e., a base station that uses three carriers on the forward link and one carrier on the reverse link) and a 1x/1x base station (i.e., a base station that uses one carrier on the forward link and one carrier on the reverse link) if the same code rate is used on the forward link, and the same RF channel and radio configuration are used on the reverse link.

One preferred embodiment for this type of handoff is to use the pilot channel signal of the multi-carrier system that corresponds to the pilot channel signal used by the single carrier system. If the channel is not the primary channel in the multi-carrier system, then the pilot associated with the channel has a transmission power level that is scaled down by a factor $\Delta$. Hence, the $\Delta$ factor must be discounted before any comparison for $T_{COMP}$ or $T_{DROP}$ is made.

Another embodiment comprises the use of Equation (2) to determine a weighted sum of all pilots in the multi-carrier system and to use the weighted sum in the rules according to IS-95.

In the alternative, the system can avoid a handoff between multiple base stations by transitioning from multiple carriers to a single carrier within a serving base station and then proceeding with a handoff from a single carrier to another single carrier according to IS-95.

When the mobile station is travelling from a single carrier system to a multi-carrier system, the single carrier system uses one of the multiple channels in the multi-carrier system. Otherwise, a hard handoff situation arises and a hard handoff search procedure begins. In the case where two base stations are not in the Active Set at the same time, the Active Set with pilots from the single carrier system is replaced by a new Active Set with pilots from the multi-carrier system. It should be noted that one can theoretically perform soft handoff between a base station that uses a single carrier in the forward link and a single carrier in the reverse link and a base station that uses multiple carriers in the forward link and a single carrier in the reverse link if the same code rate is used on the forward link and the same RF channel and radio configuration are used on the reverse link.

One preferred embodiment for this type of handoff is to implement the rules of IS-95 using the pilot in the single carrier system. If the channel is not the primary channel in the multi-carrier system, then the pilot associated with the channel has a transmission power level that is scaled down by a factor $\Delta$. Hence, the $\Delta$ factor must be discounted before any comparison for $T_{COMP}$ or $T_{DROP}$ is made.

As mentioned above, another embodiment comprises the use of Equation (1) or Equation (2) for the calculation of pilot strengths in the multi-carrier system and to use the result according to IS-95 rules.

In the alternative, the system can avoid the situation of transitioning from a single carrier system to a multi-carrier system by transitioning from a single carrier to multiple carriers within the serving base station and then proceeding with a handoff from multiple carriers to multiple carriers, such as from a 3x system to another 3x system.

Once the mobile station has determined that an autonomous PSMM must be sent to the base stations in wireless communication system, a determination must be made as to the contents of the PSMM. In certain embodiments of the invention it would be preferable to transmit pilot strength PS2 for each pilot listed in the PSMM. Accordingly, it would also be preferable to transmit pilot strengths PS1, PS3, PS4, and/or the set composing $PS5_1$, $PS5_2$, and $PS5_3$ for each pilot listed in the PSMM. Hence, the mobile station could generate a PSMM carrying pilot strength information derived from pilot strength definitions that are not used in the comparison of pilot strengths against threshold levels. If $PS5_1$, $PS5_2$, and $PS5_3$ are reported, then three times more space is required for the pilot strength field in the PSMM.

Another important field of the PSMM message is the pilot PN phase field. The pilot PN phase is used to determine the PN offset, which is used to determine the identity of the pilot channel and to obtain an estimate of the path delay between the mobile station and the target base station. One approach is to report the phase of the earliest arriving multipath of the pilot reported in the PSMM from all three carriers. A second approach is to report the phase of the earliest arriving multipath of the primary pilot. A third approach is to report the phase of the earliest arriving multipath of the strongest (highest Ec/Io) pilot received. A fourth approach is to report the phase of the earliest arriving multipath of the pilot on each carrier frequency. This fourth approach would require multiple pilot PN phase fields for each pilot PN reported.

Figure 3:
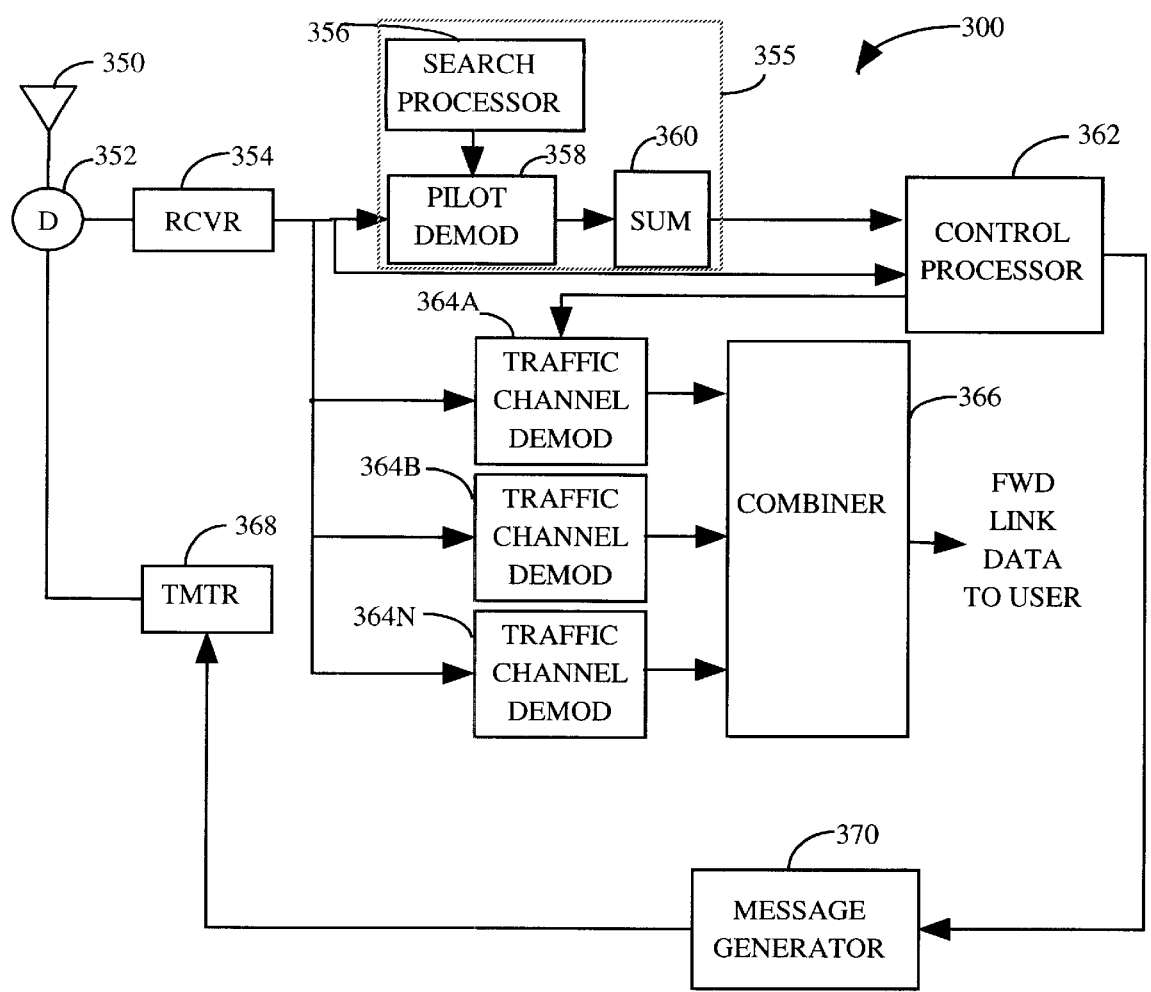
FIG. 3 is a block diagram of a mobile station used in an embodiment of the invention.

FIG. 3 illustrates mobile station 300 as used in the method of FIG. 2. Mobile station 300 continuously or at intermittent intervals measures the strength of pilot signals of neighboring base stations. Pilot signals may be transmitted on more than one carrier frequency. Signals received by antenna 350 of mobile station 300 are provided through duplexer 352 to receiver (RCVR) 354 which amplifies, downconverts, and filters the received signals, which are then provided to pilot demodulator 358 of searcher subsystem 355.

In addition, the received signals are provided to traffic demodulators 364A–364N. Traffic demodulators 364A–364N, or a subset thereof, separately demodulate signals received by mobile station 300. The demodulated signals from traffic demodulators 364A–364N are provided to combiner 366 that combines the demodulated data, which in turn provides an improved estimate of the transmitted data.

Mobile station 300 measures the strength of pilot channels. Control processor 362 provides acquisition parameters as specified by base stations to search processor 356. Specifically, control processor 362 provides such acquisition parameters to execute the method described herein with reference to FIG. 2. Control processor 362 stores the pilot signal parameters including, in the exemplary CDMA communication system, pilot strength values, PN offsets, and frequency in memory 372. Control processor 362 then accesses memory 372 to determine the scheduling of pilot searches to be executed by searcher subsystem 355. Control processor 362 may be a conventional microprocessor as is known in the art. In the exemplary embodiment of a CDMA communication system, control processor 362 provides a PN offset to search processor 356 in accordance with the next pilot signal to be searched. Search processor 356 generates a PN sequence that is used by pilot demodulator 358 to demodulate the received signal. The demodulated pilot signal is provided to energy accumulator 360 which measures the energy of the demodulated pilot signal, by accumulating the energy for predetermined lengths of time, and providing such accumulated energy samples to control processor 362.

In the exemplary embodiment, control processor 362 digitally filters the accumulated energy samples according to the pilot strength definitions discussed herein, thereby generating a pilot strength value. Control processor then compares the pilot strength value to thresholds $T_{ADD}$ and $T_{DROP}$.

Control processor 362 provides the identities of the pilots and their corresponding measured pilot strength values to message generator 370. Message generator 370 generates a Pilot Strength Measurement Message containing the information. The Pilot Strength Measurement Message is provided to transmitter (TMTR) 368, which encodes, modulates, upconverts and amplifies the message. The message is then transmitted through duplexer 352 and antenna 350.

Thus, a method and apparatus for generating pilot strength measurement messages has been described. The description is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for generating an autonomous Pilot Strength Measurement Message (PSMM) by a mobile station in a multi-carrier wireless communication system, comprising the steps of:

receiving a plurality of pilots at a mobile station, wherein the plurality of pilots are transmitted from at least one base station;

using a first pilot strength definition defined by the relationship:

$PS2 = 10 \times \log\{[(\text{Pilot } Ec/Io)_1/\Delta_1 + (\text{Pilot } Ec/Io)_2/\Delta_2 + \ldots (\text{Pilot } Ec/Io)_i/\Delta_i]/i\}$, where (Pilot Ec/Io)$_i$ is the pilot Ec/Io measured on the i-th carrier frequency, $\Delta_i$ is the ratio between the transmit power of pilot i and the transmit power of the primary pilot;

checking a set of rules, wherein the set of rules is for generating the PSMM by manipulating the first pilot strength definition; and generating the PSMM for transmission from the mobile station.

2. A method for generating an autonomous Pilot Strength Measurement Message (PSMM) by a mobile station in a multi-carrier wireless communication system, comprising the steps of:

receiving a plurality of pilots at a mobile station, wherein the plurality of pilots are transmitted from at least one base station;

using a first pilot strength definition defined by the relationship:

$PS3 = 10 \times \log\{\max[(\text{Pilot } Ec/Io)_1, (\text{Pilot } Ec/Io)_2, \ldots, (\text{Pilot } Ec/Io)_i]\}$, where (Pilot Ec/Io)$_i$ is the pilot Ec/Io measured on the ith carrier frequency;

checking a set of rules, wherein the set of rules is for generating the PSMM by manipulating the first pilot strength definition; and generating the PSMM for transmission from the mobile station.

3. A method for generating an autonomous Pilot Strength Measurement Message (PSMM) by a mobile station in a multi-carrier wireless communication system, comprising the steps of:

receiving a plurality of pilots at a mobile station, wherein the plurality of pilots are transmitted from at least one base station;

using a first pilot strength definition defined by the relationship;

$PS4 = 10 \times \log\{\max[(\text{Pilot } Ec/Io)_1/\Delta_1, (\text{Pilot } Ec/Io)_2/\Delta_2, \ldots, (\text{Pilot } Ec/Io)_i/\Delta_i]\}$, where (Pilot Ec/Io)$_i$ is the pilot Ec/Io measured on the i th carder frequency, $\Delta_i$ is the ratio between the transmit power of pilot i and the transmission power of the primary pilot;

checking a set of rules, wherein the set of rules is for generating the PSMM by manipulating the first pilot strength definition; and generating the PSMM for transmission from the mobile station.

4. A method for generating an autonomous Pilot Strength Measurement Message (PSMM) by a mobile station in a multi-carrier wireless communication system, comprising the steps of;

receiving a plurality of pilots at a mobile station, wherein the plurality of pilots are transmitted from at least one base station;

using a set of pilot strength definitions, wherein the set of pilot strength definitions comprise the set ($PS5_1$, $PS5_2$, ..., $PS5_i$), and each $PS5_i$ is defined by:

$PS5_i = 10 \times \log[(\text{Pilot } Ec/Io)_i]$, corresponding to the ith carrier frequency;

checking a set of rules, wherein the set of rules is for generating the PSMM by manipulating the set of pilot strength definitions; and generating the PSMM for transmission from the mobile station.

5. The method of claim 4, wherein the step of checking the set of rules comprise the steps of:

determining if each member of the plurality of pilots has a pilot strength that is greater than a predetermined threshold;

determining if each pilot in a candidate set is associated with a pilot strength that exceeds the pilot strength of all pilots in an active set by a comparison threshold amount; and determining if a handoff drop timer of the active set has expired.

6. The method of claim 4, wherein the step of checking the set of rules comprise the steps of:

determining if each member of the plurality of pilots has a pilot strength that is greater than a predetermined threshold;

determining if any pilot in a candidate set is associated with a pilot strength that exceeds the pilot strength of any pilot in an active set by a comparison threshold amount; and determining if a handoff drop timer of the active set has expired.

* * * * *